United States Patent [19]
Herring et al.

[11] Patent Number: 5,704,146
[45] Date of Patent: Jan. 6, 1998

[54] POSITIVE DRIVE TITLE RACK FOR JUKEBOX

[75] Inventors: Lloyd D. Herring, Rockford; Jerold R. Shaltis, Wyoming, both of Mich.

[73] Assignee: Rowe International, Inc., Grand Rapids, Mich.

[21] Appl. No.: 584,315

[22] Filed: Jan. 16, 1996

[51] Int. Cl.$^6$ .................................................. B42F 17/20
[52] U.S. Cl. ................................................. 40/509; 40/389
[58] Field of Search .................... 414/750; 271/293; 40/470, 473, 509, 530, 534, 535, 389; 369/30; 74/44, 89.17; 192/139, 143

[56] References Cited

U.S. PATENT DOCUMENTS

| | | | |
|---|---|---|---|
| 557,294 | 3/1896 | Westinghouse | 74/44 X |
| 951,995 | 3/1910 | Rodgus et al. | 74/89.17 |
| 3,412,496 | 11/1968 | Hendricks et al. | 40/389 |
| 4,433,837 | 2/1984 | Romanowski | 271/293 |
| 4,998,860 | 3/1991 | Dehne | 414/750 |
| 5,031,346 | 7/1991 | Herring et al. | 40/463 |
| 5,076,379 | 12/1991 | Bahr et al. | 74/89.17 X |
| 5,344,131 | 9/1994 | Lawrence | 271/293 X |
| 5,367,804 | 11/1994 | Domberg et al. | 40/389 |
| 5,455,609 | 10/1995 | Gast et al. | 74/89.17 X |

FOREIGN PATENT DOCUMENTS

| | | |
|---|---|---|
| 0585969A1 | 3/1994 | European Pat. Off. . |
| 1023019 | 3/1966 | United Kingdom . |
| 2197520 | 5/1988 | United Kingdom . |
| 2269264 | 2/1994 | United Kingdom . |

OTHER PUBLICATIONS

Search Report from corresponding British Application No. GB 9622994.3.

*Primary Examiner*—Joanne Silbermann
*Attorney, Agent, or Firm*—Van Dyke, Gardner, Linn & Burkhart, LLP

[57] ABSTRACT

A title rack page drive for a jukebox includes a plurality of title pages which are each pivotally mounted to pivot about a horizontal axis and a page drive for turning the pages. The page drive selectively turns an individual one of the pages at a time about the pivot axis of that page by positively engaging a pin on an individual one of the pages and applying a generally arcuate motion to each pin in order to rotate the pages about the axis.

37 Claims, 9 Drawing Sheets

POSITIVE DRIVE TITLE RACK FOR JUKEBOX

BACKGROUND OF THE INVENTION

This invention relates generally to jukebox devices which reproduce music titles selected by a user and, more particularly, to title racks which display titles available for play by the user. More particularly, the invention relates to the drive mechanism for turning the title pages of title racks.

Title racks for jukeboxes are arranged in pages, with each page displaying a "book" which lists the titles on a particular album, or compact disk, which are available for selection by the user. Each page typically includes six or more such books on each side of the page. The pages are pivotally mounted in a manner that the pages may be turned, or "flipped," by a drive mechanism. The pages are turned in a manner similar to the pages in a book in order to provide access seriatim to the contents of other pages.

For conventional title racks, the pivotally mounted pages may be turned by fingers extending from the rear of the page perpendicular to the axis of rotation of the page. A block is moved laterally along the rear support surface of the title rack into sequential engagement with the page fingers, rotating the fingers, and thereby the pages, about their axis of rotation. Such conventional mechanism has many drawbacks. When the moveable block contacts a finger, the page is abruptly accelerated with a jerking motion. For this reason, it is considered necessary to slow down the block immediately prior to contacting the finger and to speed up the block during the page-turning operation. This requires a variable speed mechanism in order to drive the block. Additionally, the jerking motion created upon initial turning of the page, as well as an inconsistent motion during the entire movement of the page, is less than satisfactory.

Such block-and-finger page drive limits page orientation to pages which pivot about a generally vertical axis. The lack of control over the rate of acceleration and deceleration of the page would preclude mounting of the pages for rotation about a horizontal axis. The reason is that gravity becomes a significant factor when the pages are rotated about a horizontal axis so that pages would tend to drop uncontrollably in one direction and be turned against the force of gravity in the opposite direction.

SUMMARY OF THE INVENTION

The present invention provides a title rack page drive which positively engages the title pages and provides a turning motion with controlled acceleration and deceleration. The pages are turned in a movement which engages the pages at zero velocity, accelerates the pages to maximum velocity, and returns the pages to zero velocity. In this manner, the conventional jerking of the pages is eliminated. The present invention provides, for the first time, a title rack in which pages may be hinged to pivot about a horizontal axis, which provides a natural viewing angle to the user.

The present invention is useful with a jukebox having a cabinet including a system for receiving a user selection of a title and means defining a window for viewing an interior portion of the cabinet. A title rack is provided in the cabinet behind the window in the interior portion of the cabinet. The title rack, according to an aspect of the invention, includes a plurality of title pages, which are each pivotally mounted to pivot about a horizontal axis, and a page drive. The page drive selectively turns an individual one of the pages at a time about the pivot axis of that page by positively engaging an individual one of the pages. The page drive positively engages the page during the entire turning of the page in order to control the speed and acceleration of the page during the turning.

A title rack, according to another aspect of the invention, includes a plurality of title pages and a page drive. Each title page is mounted to a frame to pivot about an axis and includes at least one page pin extending from an edge thereof. The page drive individually engages the pin of each of the pages in order to rotate the pages with respect to the frame. The page drive applies a generally arcuate motion to the pins in order to rotate the pages about the axis.

A title rack, according to yet another aspect of the invention, includes a plurality of title pages and a page drive for turning the pages. Each title page is mounted in a frame to pivot about an axis and includes at least one page pin extending from an edge thereof. The page drive individually engages the pin of each of the pages in order to rotate the pages with respect to the frame. The page drive includes a carriage that travels in a substantially linear direction along the frame in order to move from one individual page to another individual page. The page drive further includes a lever on the carriage having a portion that moves, in part, in a substantially arcuate motion in order to engage the pin of an individual page and turn that page. The carriage may include a crank assembly having a crank pin, which engages the lever to cause the lever portion to move in the arcuate motion, and a prime mover for rotating the crank assembly. The page driver may further include a rack and pinion, driven from the prime mover, in order to move the carriage in its linear motion. The carriage may further include a slide having an elongated slot, including an arcuate portion defined therein, with the page pins being confined to travel in the slot. The carriage may be provided with a pin trap for trapping pins on opposite sides of the arcuate portion when the page drive is not turning a page.

These and other objects, advantages, and features of this invention will become apparent upon review of the following specification in conjunction with the drawings.

DESCRIPTION OF THE PREFERRED EMBODIMENT

Figure 1:
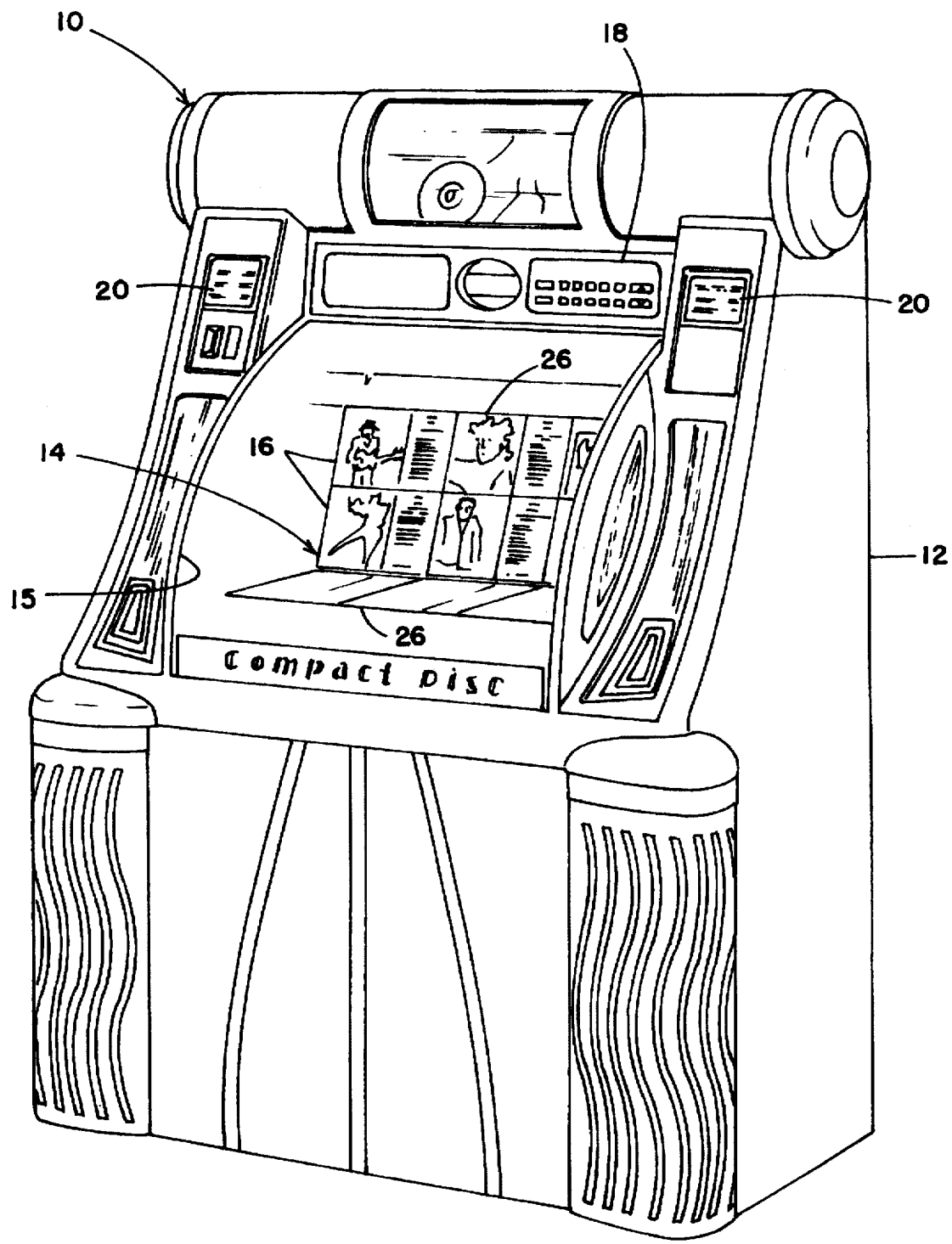
FIG. 1 is a perspective view of a jukebox incorporating the invention.

Referring now specifically to the drawings and the illustrative embodiments depicted therein, a jukebox 10 includes a cabinet 12 and a title rack 14 within cabinet 12 (FIG. 1). The title rack is viewable by the user, through a window 15 in the cabinet. The title rack displays title books 16 in order to present titles available for selection by the user by a selection panel 18. Jukebox 10 includes other input devices 20, such as currency acceptors and the like, and a reproduction mechanism (not shown) within cabinet 12 in order to produce the title selected by the user. In the illustrated embodiment, juke box 10 reproduces music stored on compact audio disks. However, the invention may be applicable to other storage media, such as records, tapes, video disks, and the like.

Figure 2:
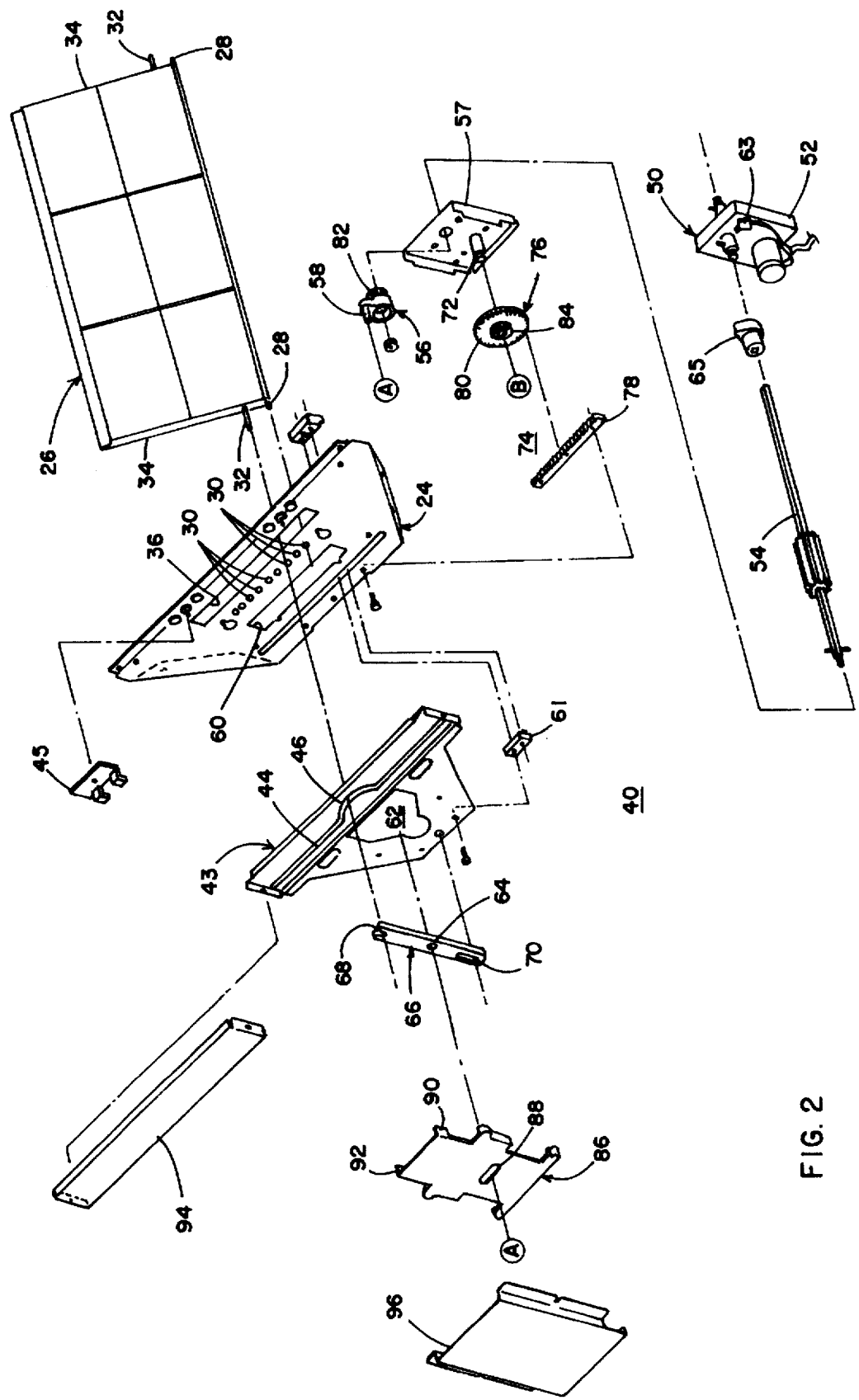
FIG. 2 is an exploded perspective view of a title rack according to the invention.
Figure 3:
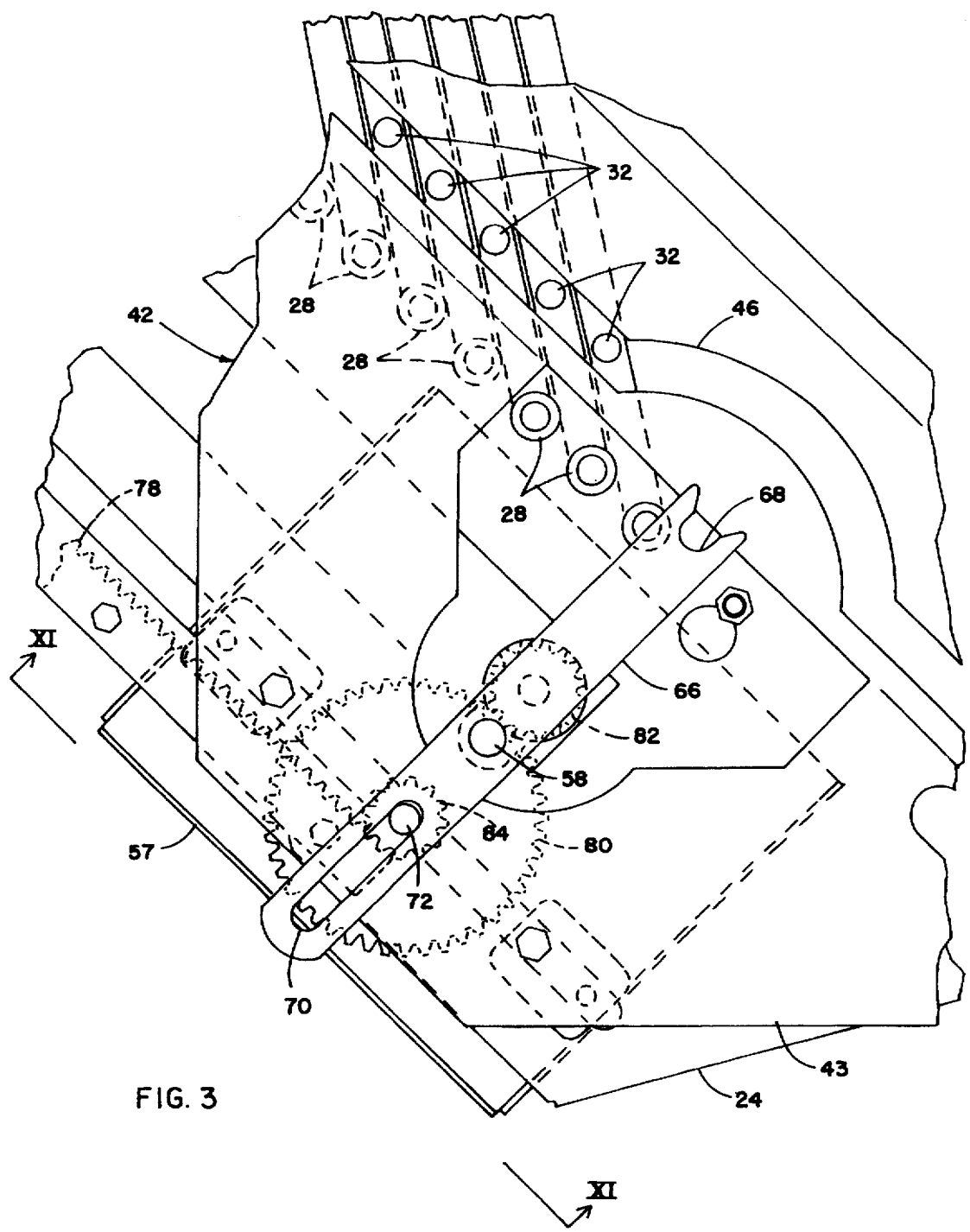
FIG. 3 is a side elevation of a page drive according to the invention.
Figure 11:
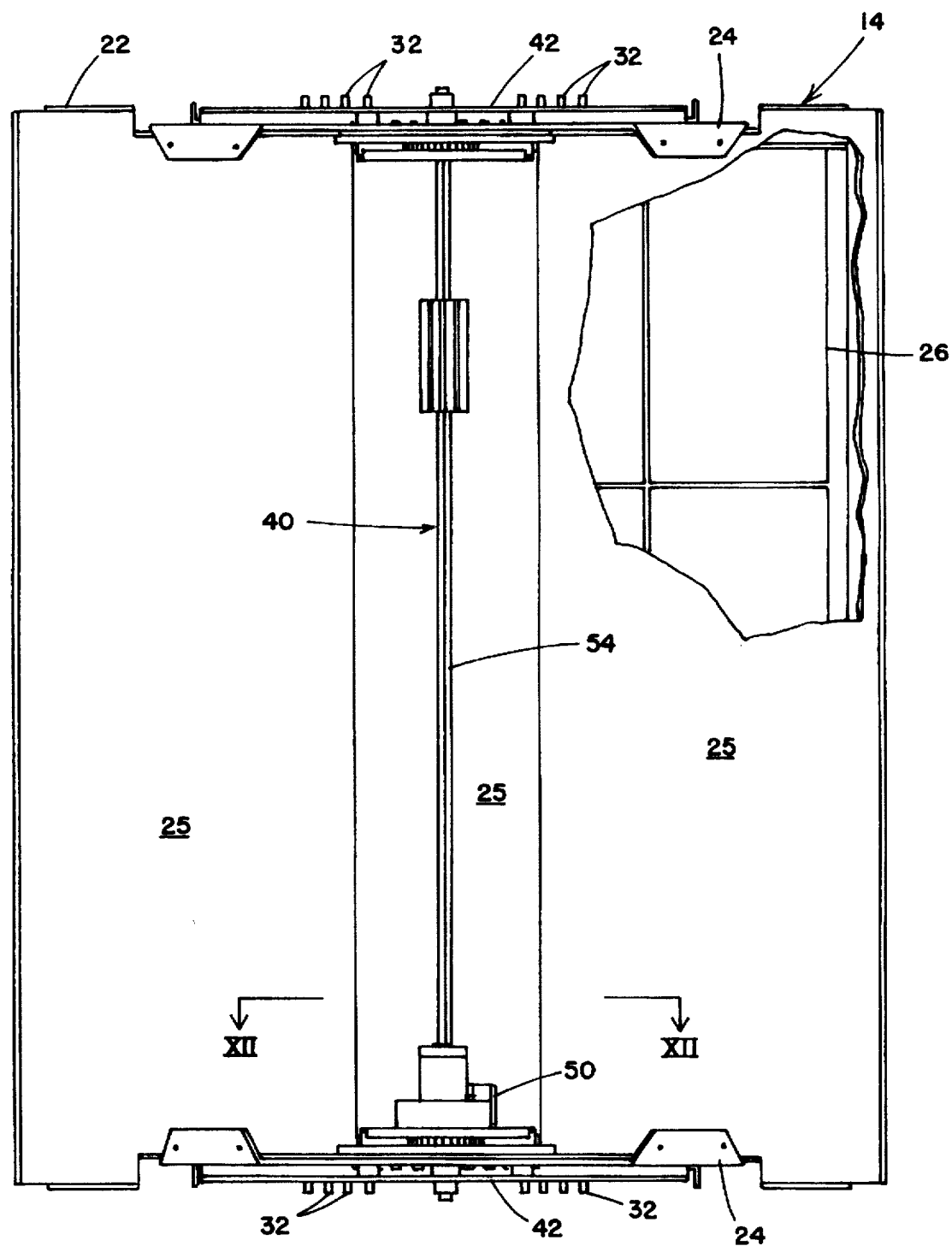
FIG. 11 is a view from the direction indicated at XI—XI in FIG. 3.

Title rack 14 includes a frame 22 and a plurality of pages 26 supported by the frame (FIGS. 2 and 11). Frame 22 includes a pair of spaced apart vertical supports 24 joined by a folded back panel 25. Title rack 14 is a horizontal axis title rack, wherein pages 26 are pivotally mounted by pivots 28 to rotate about a generally horizontal axis extending through the pivots. Each pivot 28 is individually positioned within an opening 30 in vertical support 24. Openings 30 are spaced apart and arranged in a row along each vertical support 24. Each page 26 additionally includes a pair of page pins 32 which extend from opposite lateral edges 34 of page 26. The page pins of all of the pages extend through an aperture 36 formed in vertical support 24 which is elongated in the direction of the row of openings 30.

Title rack 14 additionally includes a page drive generally shown at 40. Page drive 40 travels linearly along vertical support 24 in the general direction of elongation of aperture 36 in order to move from page to page, while producing an arcuate motion which is applied to the page pins 32 of a particular page in order to turn that page. The linear movement of the page drive along the vertical support causes the same arcuate motion to be subsequently applied to the page pins 32 of the next page in order to turn the pages seriatim. This combination linear and arcuate motion is repeated in order to continue to turn the pages until the user pauses to observe the content of a particular page. The linear and arcuate motions may be reversed to turn the pages in the opposite direction.

Page drive 40 includes a pair of carriages 42, each having a slide 43 which is slidable along a respective vertical support 24. Slide 43 includes a slot 44 generally overlying aperture 36. Slot 44 has an arcuate portion 46 generally centrally thereof. Each carriage 42 includes a drive mechanism 48 which is positioned on the opposite side of vertical support 24 from slide 43. Each drive mechanism 48 includes a crank assembly 56 rotatably mounted to a bracket 57. Crank assembly 56 is rotated by a shaft 54 which extends between drive mechanisms. Shaft 54 is rotated by a single prime mover 50 made up of an electrical motor, and gear reducer assembly 52. Prime mover 50 is a bidirectional drive which is driven at a constant speed in opposite rotation directions by an electronic drive module (not shown). Crank assembly 56 includes a crank pin 58 which extends through an aperture 60 in vertical support 24 and an aperture 62 in slide 43 and engages an opening 64 in a lever 66. Lever 66 includes a mouth 68 at one end thereof and an elongated slot 70 at an opposite end thereof. A stationary pin 72 extends through slot 70 and is affixed to bracket 57. In this manner, the rotary motion of prime mover 50 rotates crank assembly 56 of each drive mechanism 48 which causes crank pin 58 to move in a circular motion. This circular motion causes mouth 68 to move in an annular motion which coincides with the shape of arcuate portion 46 of slot 44 during a portion of each annular cycle of mouth 68. Lever 66 generally reciprocates with respect to slide 43 by elongated slot 70 reciprocating with respect to pin 72.

Figure 5:
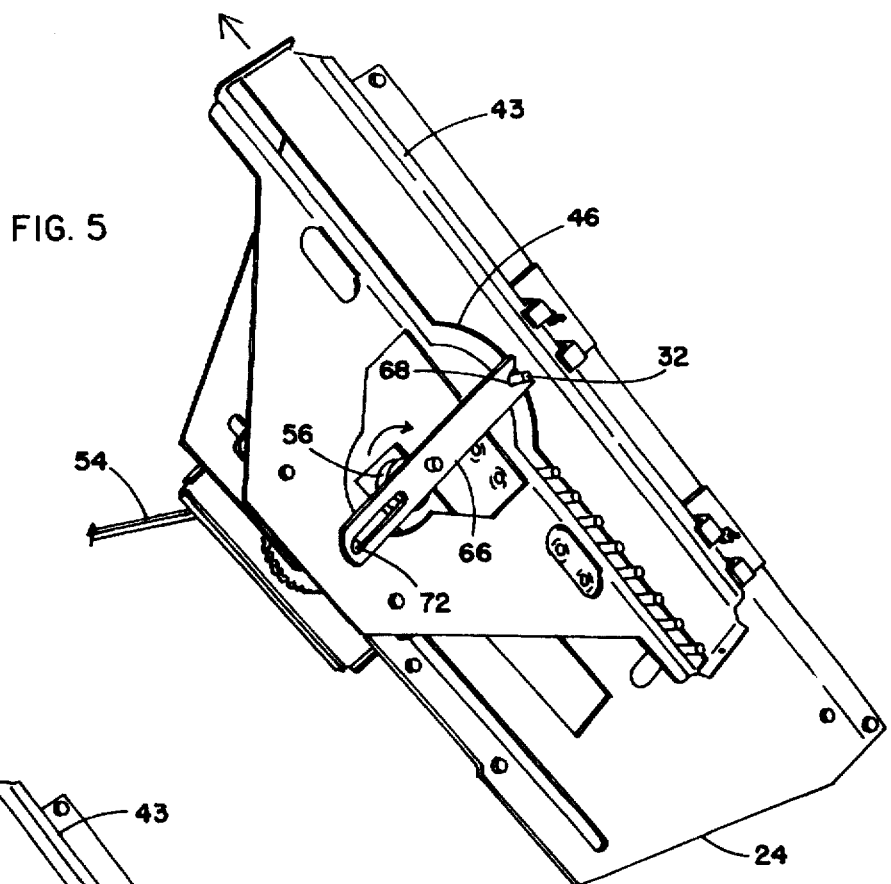
FIG. 5 is the same view as FIG. 4 illustrating the page drive turning a page.
Figure 12:
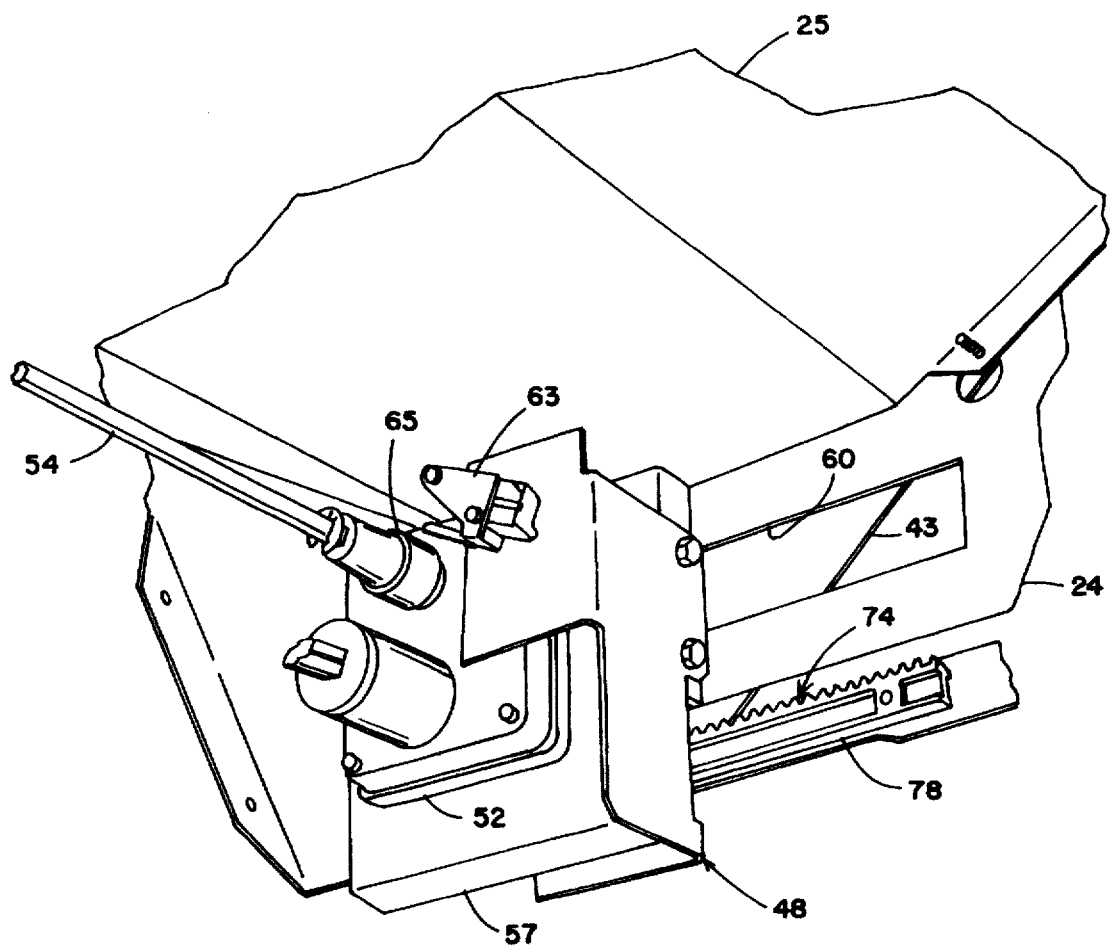
FIG. 12 is a perspective view from the general direction indicated at XII—XII in FIG. 11.

Page drive 40 additionally includes a pair of linear motion mechanisms generally illustrated at 74 (FIGS. 5 and 12). Each mechanism 74 is made up of a rack 78 and pinion 84. Each rack 78 is affixed to a respective vertical support 24 below aperture 60. A reduction gear 76 is provided that is rotatably mounted to bracket 57 and has a large diameter gear 80 which engages a small diameter gear 82 on crank assembly 56. Reduction gear 76 additionally includes pinion 84 which engages the teeth of rack 78. In this manner, the rotation of crank assembly 56 by prime mover 50 causes a rotation of reduction gear 76 by the engagement of gears 82 and 80 which rotation is translated to a linear motion by the engagement between pinion 84 and rack 78. This linear motion causes each carriage 42 to move along vertical support 24 concurrently with mouth 68 moving in an annular motion, a portion of which coincides with arcuate portion 46 of slot 44. During the portion of the annular motion of mouth 68 which corresponds with arcuate portion 46, the mouth is positively engaging a page pin 32 in order to turn a page. Mouth 68 is retracted away from arcuate portion 46 during the remaining portion of its annular motion. Mouth 68 moves in one direction, to turn pages 26 upwardly, upon prime mover 50 being rotated in one direction, and moves in the opposite direction, to turn pages 26 downwardly, upon prime mover 50 being rotated in an opposite direction. Page drive 40 includes a first electrical switch 61 mounted to slide 43 in order to provide an end-of-travel signal to the control (not shown) upon the slide reaching the end-of-travel in its linear motion in either direction. Page drive 40 includes a second electrical switch 63 mounted to prime mover 50 and actuated by a cam 65 in order to signal to the control each revolution of shaft 54 in either direction. One or more retainers 45 may be provided to maintain slide 43 in contact with vertical support 24.

Figure 4:
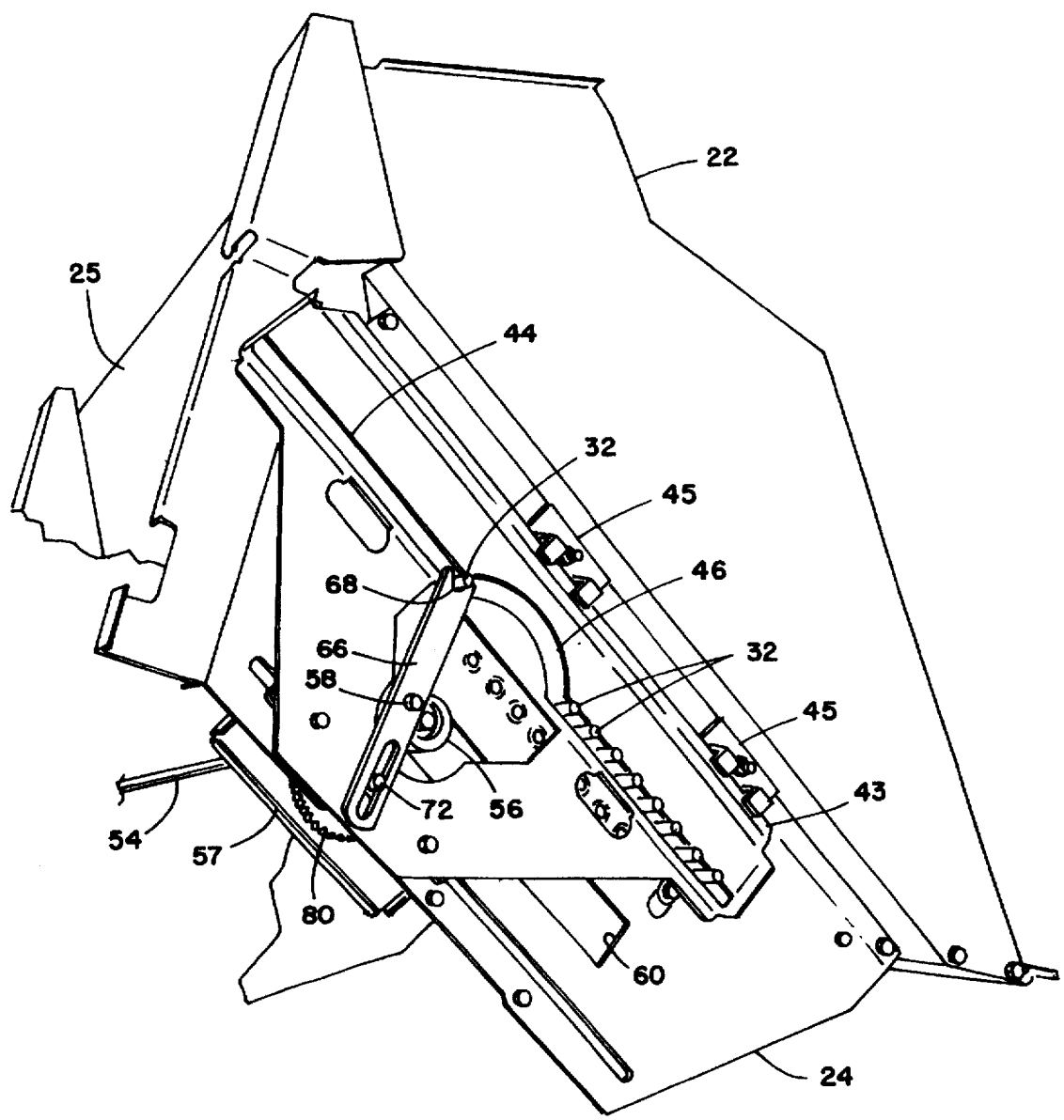
FIG. 4 is a perspective view illustrating the page drive engaging a page pin to turn the page.
Figure 6:
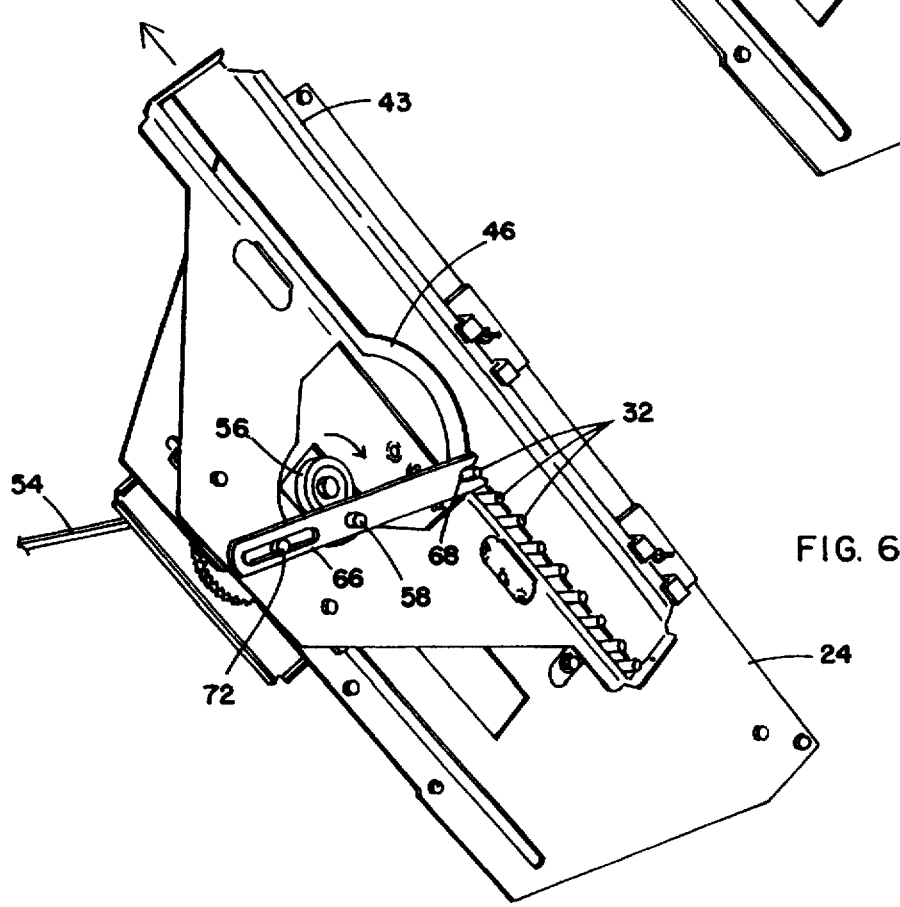
FIG. 6 is the same view as FIGS. 4 and 5 illustrating the page drive disengaging from the page.
Figure 7:
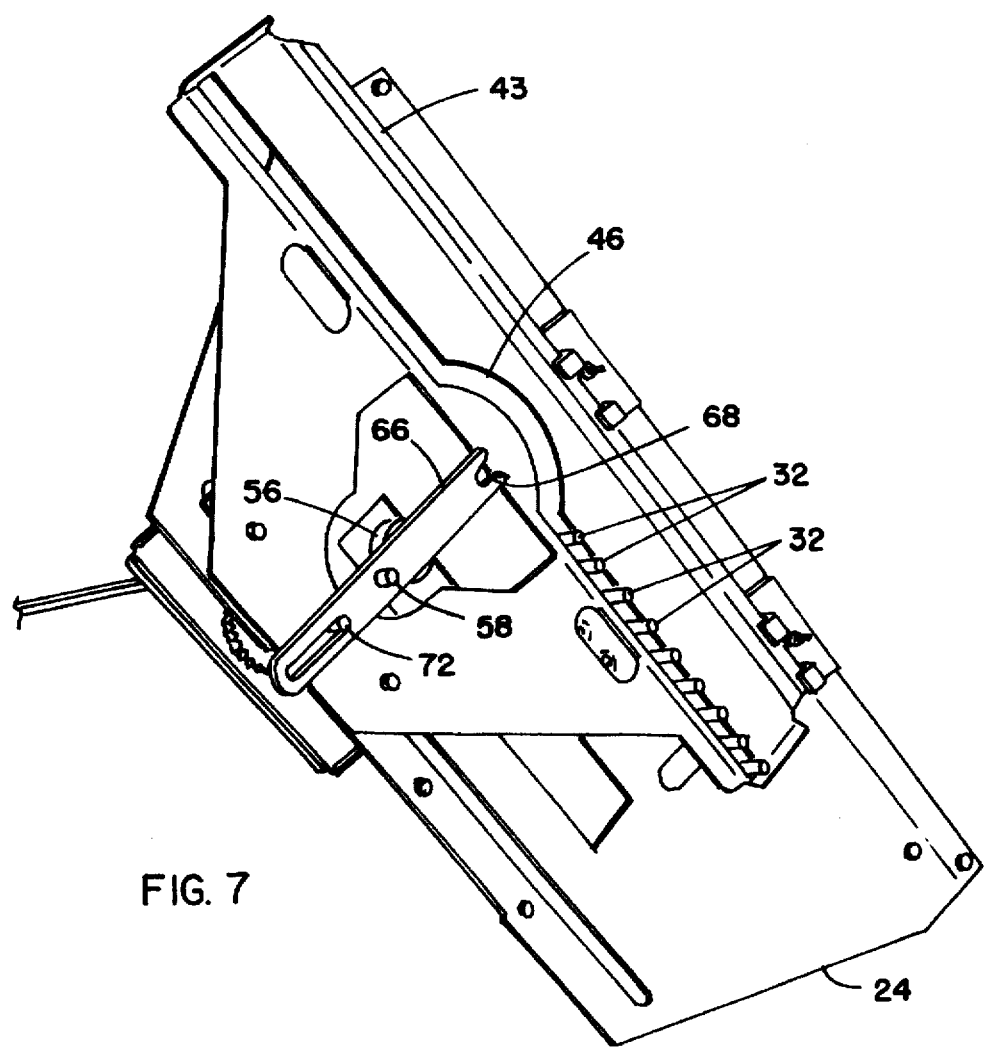
FIG. 7 is the same view as FIGS. 4–6 illustrating the page drive in a neutral position.

Operation of page drive 40 is illustrated by reference to FIGS. 4–6. In FIG. 4, crank pin 58 is rotating toward arcuate portion 46 of slot 44 thereby causing lever 66 to positively engage a page pin 32 by mouth 68. As crank assembly 56 rotates further in the clockwise direction, as viewed in FIGS. 4–6, mouth 68 moves toward the right, moving page pin 32 enveloped in mouth 68 along arcuate portion 46, as illustrated in FIG. 5. Further rotation of crank assembly 56 brings mouth 68 and the enveloped page pin 32 to the rightmost side of arcuate portion 46, as viewed in FIG. 6. Upon which further rotation of the crank assembly, mouth 68 is withdrawn from the page pin to the position illustrated in FIG. 7. Further rotation of the crank assembly causes this cycle to repeat, turning the next page. Concurrently with the cyclical motion of mouth 68 of lever 66, page drive 40 moves laterally to the left, as viewed in FIGS. 4–7, in order to bring mouth 68 into sequential engagement with each of the page pins seriatim. When it is desired to move the pages in the opposite direction about pivots 28, prime mover 50 is rotated in the opposite direction which causes the sequence illustrated in FIGS. 4–7 to be carried out in reverse.

As each page pin is brought into page-turning position adjacent arcuate portion 46, by the lateral motion of slide 43, the page pins not adjacent arcuate portion 46 are latched in their appropriate positions by slot 44. However, if title rack 14 is removed from jukebox 10, for service or the like, a slide trap 86 is provided in order to retain the page pins adjacent arcuate portion 46 in their respective positions. This prevents random motion of the pages 26 during service of the title rack which, if not prevented, could result in a misalignment of the components upon reassembly of the title rack.

Figure 8:
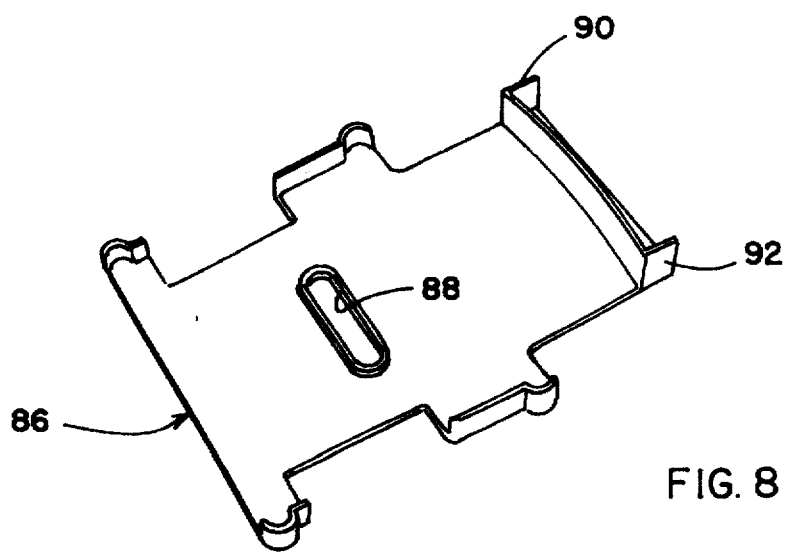
FIG. 8 is a perspective view, taken from the bottom, of a pin trap.
Figure 9:
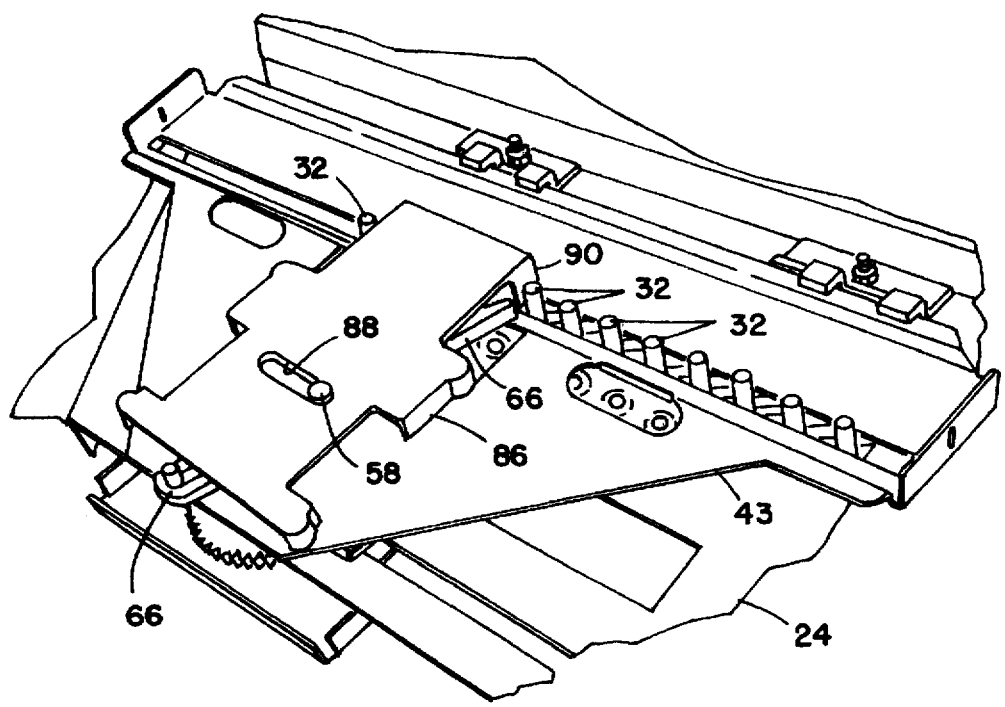
FIG. 9 is a perspective view illustrating the pin trap positioned on the page drive carriage.
Figure 10:
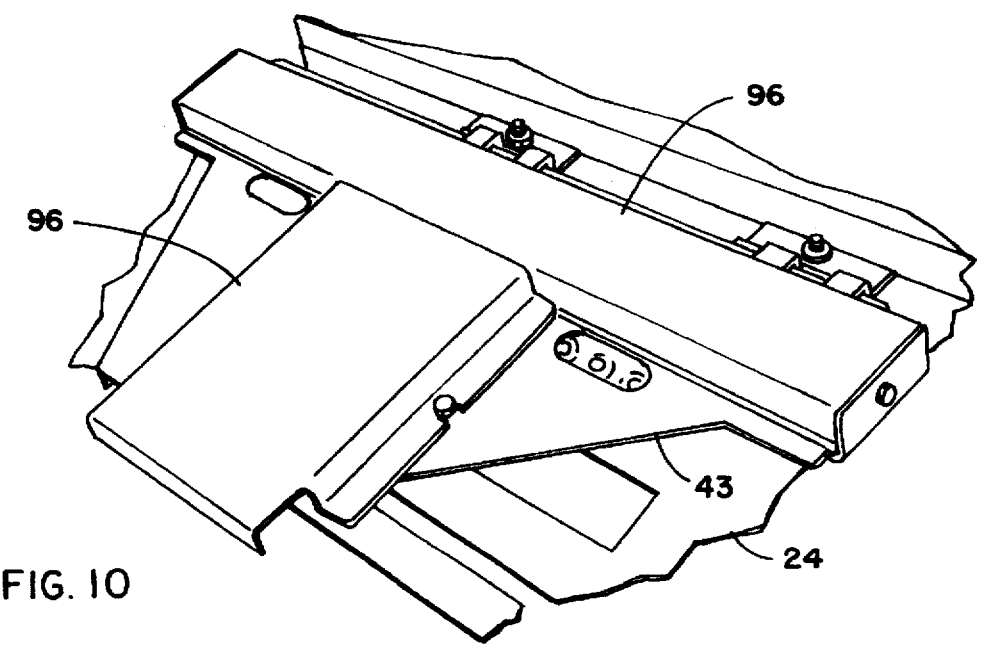
FIG. 10 is the same view as FIG. 9 illustrating covers over the page drive carriage.

Slide trap 86 includes a slot 88 which is engaged by crank pin 58 which causes slide trap 86 to move in a reciprocal motion with respect to arcuate portion 46 of slot 44 in response to rotation of crank assembly 56 (FIGS. 8 and 9). Slide trap 86 includes a first lateral wall 90 and a second lateral wall 92 which are spaced apart and positioned to coincide with the ends of arcuate portion 46. As slide trap 86 moves into the position illustrated in FIG. 9, lateral walls 90, 92 prevent movement of the page pins 32 adjacent arcuate portion 46 from moving into arcuate portion 46. Slide trap 86 moves upwardly out of engagement with the page pins, and exposes arcuate portion 46, in response to further movement of the crank assembly during the portion of the motion of mouth 68 that moves the next page pin through arcuate portion 46 of the slot. In this manner, the motions of slide trap 68 and lever 66 are coordinated in order to provide, in cooperation with slot 44, a positive trapping of each page pin at all times. Title rack 14 further includes a first cover 94 which extends substantially over slot 44 and a second cover 96 which extends substantially over page drive 40. The purpose of covers 94 and 96 is to substantially eliminate the transfer of light from the internal portions of cabinet 12 into title rack 14 through slot 44. Such internal portions often contain various light sources which should not be visible through the sides of the title racks.

In the illustrated embodiment, crank assembly 56 and rack 78 are made from a polymeric material, such as glass filled nylon. Reduction gear 76 is also made from a polymeric material, such as Delrin. In the illustrated embodiment, motor assembly 52 includes a DC brush motor which is operated at a constant speed through a pulse-width modulated electronic drive (not shown) at a speed that is selected to be in the range of approximately 3,000 to 10,000 rpms. The motor shaft speed is reduced to an output speed of prime mover 50 of approximately 30 revolutions per minute at 200-inch ounces or more of torque. The purpose of the pulse-width modulation of the motor is to allow selection of the appropriate speed of the motor, as an operator setting, by varying the pulse-width of the drive, as is well known to those skilled in the art.

In the illustrated embodiment, page pins 32 and page drive 40 are replicated on opposite sides of the title rack and interconnected by shaft 54. It would also be possible to drive pages 26 by a page drive on one side only. However, flexing in the pages would be more noticeable. Additionally, it would be possible to reverse the location of stationary pin 72 and crank pin 58 with respect to lever 66. However, the disclosed arrangement is preferred because driving of the page pins occurs during 270° of revolution of the crank assembly rather than 90° providing a more effective use of power and control. Also, in the illustrated embodiment, prime mover 50 is attached to slide 43 and thereby moves with the linear motion of carriage 42. It would additionally be possible to mount the prime mover stationary to frame 22 and interconnect the output of the prime mover to shaft 54 by belts or other flexible transfer means, in a manner known to skilled artisans. Although the motor is illustrated as being a constant speed motor, it would be possible to modulate the speed of the motor during each cycle of lever 66 in order to further control the acceleration and deceleration of the pages. The invention additionally comprehends the provision of a manually operateable knob mounted to one or both ends of shaft 54 in order to allow manual rotation of the shaft during maintenance on title rack 14. Although the invention is illustrated with a title rack having pages which pivot about horizontal axes, the principles of the invention may find application for vertically pivoted title racks.

The invention provides a positive engagement between the page drive and the pages which creates an essentially zero velocity motion of the pages at the beginning and end of the turn with a controlled acceleration of the page throughout the turn. This eliminates the jerk associated with prior title rack page drives by providing a positive direct engagement between the page drive and the pages during the turning of the page.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A jukebox, comprising:
    a cabinet including a system for receiving a user selection of a title and means defining a window for viewing an interior portion of said cabinet; and
    a title rack in said cabinet behind said window in said interior portion;
    wherein said title rack includes a plurality of title pages that are each pivotally mounted to pivot about a horizontal axis and an electrical motor-operated page drive that selectively turns an individual one of said pages at a time about the pivot axis of that page by engaging an individual one of said pages, wherein said page drive positively engages the page during the entire turning on the page and controls the speed and acceleration of the page during said turning.

2. The jukebox in claim 1 wherein said page drive engages a page at substantially zero velocity in the turning direction and releases a page at substantially zero velocity in the turning direction, whereby a page is turned with substantially no jerk.

3. The jukebox in claim 2 wherein said page drive accelerates a page for substantially one half of the turning movement and decelerates a page for substantially the other half of the turning movement.

4. The jukebox in claim 1 wherein each of said pages pivot about an individual horizontal axis.

5. The jukebox in claim 1 wherein said page drive includes a first mechanism on one lateral side of said pages and a second mechanism on the opposite lateral side of said pages in order to positively engage an individual one of said pages on both of said sides in order to turn that page.

6. The jukebox in claim 5 wherein each of said pages includes page pins extending from each of said sides, wherein each of said mechanisms positively engage said page pins in order to turn an individual page.

7. The jukebox in claim 6 wherein said page pins extend along axes that are horizontal.

8. The jukebox in claim 5 including a shaft extending between said mechanisms in order to coordinate movement of said mechanisms.

9. The jukebox in claim 8 including a constant velocity prime mover to rotate said shaft in order to turn an individual page.

10. The jukebox in claim 9 wherein each of said mechanisms includes a carriage that travels in a substantially linear motion in order to move from one individual page to another individual page and a lever having a portion that moves in part in a substantially arcuate motion in order to positively engage an individual page and turn that page.

11. The jukebox in claim 10 wherein said motor is mounted to one said carriage.

12. The jukebox in claim 5 wherein each of said mechanisms includes a carriage that travels in a substantially linear motion in order to move from one individual page to another individual page and a lever having a portion that moves in part in a substantially arcuate motion in order to positively engage an individual page and turn that page.

13. A jukebox, comprising:

a cabinet including a system for receiving a user selection of a title and means defining a window for viewing an interior portion of said cabinet; and a title rack in said cabinet behind said window in said interior portion, said title rack including a plurality of title pages and a page drive for turning said pages, wherein each title page is mounted in a frame to pivot about an axis and includes at least one page pin extending beyond an edge thereof, and wherein said page drive includes a portion which individually engages said pin of each of said pages in order to rotate said pages with respect to said frame, wherein said page drive portion moves in a generally arcuate motion thereby applying a generally arcuate motion to said pins in order to rotate said pages about said axis.

14. The jukebox in claim 13 wherein said page drive travels generally linearly along said frame while said portion applying said generally arcuate motion.

15. The jukebox in claim 14 wherein said pins extend beyond said edge generally parallel to said axis and wherein said drive travels linearly in a direction generally perpendicular to said axis.

16. The jukebox in claim 15 including a pair of said page pins extending beyond opposite edges of each said page and a pair of said page drives including portions on opposite sides of said frame, each moving in a generally arcuate motion thereby applying a generally arcuate motion to one of said pair of page pins.

17. The jukebox in claim 16 wherein said page drives are interconnected with a shaft.

18. The jukebox in claim 15 wherein said page drive includes a slide having a slot defined therein, said page pins being in said slot.

19. The title jukebox in claim 18 wherein said slot includes an arcuate portion.

20. The jukebox in claim 19 including a pin trap for trapping pins on opposite sides of said arcuate portion when said page drive portion is not applying said arcuate motion to one of said page pins.

21. The jukebox in claim 20 including a cover for said slide over said slot in order to substantially avoid penetration of said slide.

22. The jukebox in claim 21 wherein said cover envelopes said pin trap.

23. The jukebox in claim 18 including a cover for said slide over said slot in order to substantially avoid penetration of said slide.

24. The jukebox in claim 13 wherein said page drive includes a lever having a mouth adapted to engage each said pin and a crank assembly connected with said lever in a manner which causes said mouth to move in an arcuate motion in response to rotation of said crank assembly.

25. The jukebox in claim 24 wherein said page drive further includes a rack and pinion coupled with said crank assembly in order to impart generally linear motion to said page drive in response to rotation of said crank assembly.

26. The jukebox in claim 25 wherein said page drive further includes a reversible prime mover coupled with said crank assembly in order to selectively rotate said crank assembly in opposite directions.

27. A jukebox, comprising:

a cabinet including a system for receiving a user selection of a title and means defining a window for viewing an interior portion of said cabinet; and a title rack in said cabinet behind said window in said interior portion, said title rack including a plurality of title pages and a page drive for turning said pages, wherein each title page is mounted in a frame to pivot about an axis and includes at least one page pin extending beyond an edge thereof, and wherein said page drive individually engages said pin of each of said pages in order to rotate said pages with respect to said frame;

wherein said page drive includes a carriage that travels in a substantially linear motion along the frame in order to move from one individual page to another individual page and a lever on said carriage having a portion that moves in part in a substantially arcuate motion in order to engage the pin of an individual page and turn that page.

28. The jukebox in claim 27 wherein said carriage includes a crank assembly having a crank pin which engages said lever to cause said lever portion to move in part in a substantially arcuate motion and a prime mover for rotating said crank assembly.

29. The jukebox in claim 28 wherein said page drive further includes a rack and pinion driven from said prime mover in order to move said carriage in said substantially linear direction.

30. The jukebox in claim 29 including a reduction gear coupling said pinion with said prime mover.

31. The jukebox in claim 30 wherein said reduction gear is coupled with said prime mover through said crank assembly.

32. The jukebox in claim 27 wherein said carriage includes a slide having a slot defined therein, said page pins being in said slot.

33. The jukebox in claim 32 wherein said slot includes an arcuate portion.

34. The jukebox in claim 33 including a pin trap for trapping pins on opposite sides of said arcuate portion when said page drive is not turning a page.

35. The jukebox in claim 34 including a cover for said slide over said slot in order to substantially avoid penetration of said slide.

36. The jukebox in claim 35 wherein said cover envelopes said pin trap.

37. The jukebox in claim 32 including a cover for said slide over said slot in order to substantially avoid penetration of said slide.

* * * * *